United States Patent [19]

Appleyard et al.

[11] Patent Number: 4,574,065

[45] Date of Patent: Mar. 4, 1986

[54] NON-DIRECTIONAL FLOOR TILE

[75] Inventors: Francis J. Appleyard, East Petersburg; John H. Young, Lancaster, both of Pa.

[73] Assignee: Armstrong World Industries, Inc., Lancaster, Pa.

[21] Appl. No.: 635,057

[22] Filed: Jul. 27, 1984

Related U.S. Application Data

[62] Division of Ser. No. 564,033, Dec. 21, 1983, abandoned.

[51] Int. Cl.[4] ........................ B32B 27/04; B32B 27/20

[52] U.S. Cl. ...................................... 264/76; 264/145; 264/175; 428/46; 428/67; 428/323

[58] Field of Search ................... 428/67, 46, 141, 143, 428/323; 264/76, 175, 145; 427/365

[56] References Cited

U.S. PATENT DOCUMENTS

| | | | |
|---|---|---|---|
| 2,624,068 | 1/1953 | Dobry | 264/39 |
| 2,995,179 | 8/1961 | Scolamiero | 428/67 |
| 3,015,356 | 1/1962 | White et al. | 264/76 |
| 3,062,604 | 11/1962 | Hodgen | 428/49 |
| 3,145,241 | 8/1964 | Powell | 264/175 |
| 3,194,856 | 7/1965 | Palmer | 264/112 |
| 3,344,011 | 9/1967 | Goozner | 428/67 |

*Primary Examiner*—Paul J. Thibodeau

[57] ABSTRACT

A floor tile product is manufactured with a random or non-directional tile pattern. This is accomplished by adding a hard material such as ground marble to the tile base mix. This hard material will not elongate under the pressure of the calender roll to provide a directional effect. The hard material appears in the surface of the finished tile as a dot pattern which has no smeared or directional, elongated shape.

1 Claim, No Drawings

NON-DIRECTIONAL FLOOR TILE

Cross-Reference to Related Application

This is a division of application Ser. No. 564,033, filed Dec. 21, 1983 now abandoned.

BACKGROUND OF THE INVENTION

1. Field of the Invention

The invention is directed to a floor tile and, more particularly, to a floor tile with a non-directional pattern.

2. Description of the Prior Art

U.S. Pat. No. 2,663,663 does not deal with a tile-making process, but the patent does disclose the additional of crushed marble to a thermosetting synthetic resin laminate. The crushed marble is not added to produce a pattern, but is instead added to provide a roughened surface.

U.S. Pat. No. 3,145,241 is directed to a floor covering material with a non-directional pattern which is accomplished by limiting the number of granules added to the base.

U.S. Pat. No. 2,624,068 is directed to a non-directional pattern in a floor covering material wherein the particles are compressed in two normal directions to prevent directional orientation.

U.S. Pat. No. 3,194,856 is directed to a non-directional pattern in a floor covering material, and this is accomplished by using one hot and one cold calender roll with the cold roll contacting the particles.

U.S. Pat. No. 2,995,179 shows the use of ground limestone as a filler in a tile, but not as a decorative material.

Finally, U.S. Pat. No. 2,120,281 shows the use of hard silica gel in a rubber battery separater which is subsequently vulcanized, but again, the silica gel is not included for decorative purposes.

SUMMARY OF THE INVENTION

The invention is directed to an improved composition comprising a filled plastic mass of a primary coloration having a thermoplastic binder system and a filler. The tile is formed in a flat sheet shape and one surface thereof is considered to be the wear surface, and this is the surface which face upward from the tile when it is installed on a floor. The tile has a plurality of particles of 10 to 60 mesh size distributed in the surface area of the tile. The particles are of a contrasting coloration to the plastic mass primary coloration and are in a circular unsmeared shape. The particles are basically marble particles which are not smeared or directionally oriented during the calendering operation which forms the floor tile.

The method of making the product is the forming of the filled plastic mass with the marble particles and then calendering the mass into a sheet form and from the sheet, cutting the plurality of 12"×12" or like floor tiles. Many of the marble particles appear in the surface of the tile product and have not been smeared or elongated during the calendering operation, but do appear as small dots of a contrasting color on the surface of the tile product.

DESCRIPTION OF THE PREFERRED EMBODIMENT

The tile product of the invention herein is basically made by a process very similar to that carried out in the prior art in U.S. Pat. No. 2,995,179. The materials are mixed in a Banbury or like intensive mixer, dropped on a sheeting mill and passed through hot calender rolls to form a sheet of the final thickness which then is cut to desired tile dimensions.

A typical composition that could be used is the following composition with the formulations set forth as follows:

| Ingredient | Percent by Weight |
|---|---|
| Resin: A mixture of 33% by weight of polyvinyl chloride and 67% by weight of a 90–10% blend of polyvinyl chloride and polyvinyl acetate | 13.6 |
| Ground limestone (40 mesh & finer) | 71.6 |
| Colored marble (10–60 mesh) | 8.0 |
| Plasticizer (di-octyl-phthalate) | 4.5 |
| Process Aid (alpha-methyl-styrene) | 1.0 |
| Stabilizer (melamine base with a metallic soap) | .8 |
| Pigment (titanium oxide) | .5 |
| | 100.0 |

The raw materials are charged in a standard manner into a Banbury or like intensive mixer. All the colored marble are added after all the other materials have been blended together. The color of the marble is a contrasting color to that of the pigment for the tile product. The material is then sheeted out in the conventional manner as set forth in U.S. Pat. No. 2,995,179.

What is unique about the finished product is that it is a non-directional tile pattern. The calendering operation does not smear or elongate the marble particles as it would do in a normal tiling operation where the contrasting colored particles would be of a soft thermoplastic material, and this would tend to elongate or provide a smeared line effect on the finished product. The product made in the invention of this application ends up with a rather uniform dot or circular contrasting color spot and the product in effect looks very much like one has sprinkled ground black pepper relatively uniformly across the surface of a white or light color tile base. The smeared tile product has a directionality in that the tile seems to extend in the direction of the smearing. Herein, there is no smearing and therefore, the tile can be turned in any one of the four standard quadrants and not appear to have a directionality in its dot design.

The dot pattern of the finished product can be enhanced by grinding the surface of the tile product to remove anywhere from 0.002 to 0.010 of an inch.

It may be desirable to grind the surface of the product to highlight the dot design, but this is not necessary for securing the unsmeared pattern on the surface of the tile.

It is also possible to use a plastic particle in the invention provided that the plastic particle is sufficiently hard that it will not streak during coloring.

The hard plastic resin that could be used in lieu of the marble particles is a resin such as bakalite which has a hardness of "Shore D" of approximately 82.

The preferred particle material to be used is a marble particle that has a size such that it will pass through a 10 mesh screen, but will not pass through a 60 mesh screen. This is referred to as a particle size of 10 to 60 mesh. The mesh hole ratings are the U.S. standard screen ratings used to identify particle size.

The marble particles could be uniformly spread through the whole sheet and/or they could be concentrated primarily on the surface layer of the sheet. They could be concentrated on the surface layer by either being made as a separate layer to be added to a base layer, or made as a layer which is sprinkled on the top of the hot sheet after it is first milled and then subsequently passed through additional calendering steps which would tend to embed the stone particles in the upper surface area of the sheet product.

By the term "marble particles" is meant in general any of a family of stone particles having a Mohs hardness in the range of 2.5 to 3.5. The roll separating forces during the milling operation provides a pressure of about 3.2 tons per linear inch width at the time the mass of plastic material is formed into a sheet. It is during the application of pressure of this magnitude that the hard particles are not smeared into a directional pattern.

What is claimed is:

1. A method for making an improved composition tile having a filled thermoplastic mass of a primary coloration, said mass being a thermoplastic binder system and a filler, the steps comprising:

(a) mixing together the thermoplastic binder system and a filler in a conventional mixing means, (b) at some point prior to removing the mass of plastic material from the mixer, blending thereinto a mass of hard particle means of marble with a Mohs hardness of 2.5 to 3.5 and having a coloration different from the coloration of the thermoplastic mass, (c) dumping the plastic mass from the mixer onto a two-roll mill or calendering means which will pass the mass between the nips of the rolls and form the mass of material into a sheet form, and then forming the sheet into a plurality of square tile units wherein the hard particle means added to the plastic mass will appear as a dot pattern distributed across the surface of the tile product appearing as non-directional, unsmeared shapes in the surface area of the tile product, with the hard particles being of a contrasting coloration to the coloration of the plastic mass, and said filled plastic mass of subparagraph (a) being in an elongated smeared direction.

* * * * *